United States Patent [19]

Leiweke

[11] Patent Number: 5,065,670
[45] Date of Patent: Nov. 19, 1991

[54] CONVEYOR FOR DOUGHNUT FRYER

[75] Inventor: Michael E. Leiweke, Arnold, Mo.

[73] Assignee: Continental Baking Company, St. Louis, Mo.

[21] Appl. No.: 687,975

[22] Filed: Apr. 19, 1991

[51] Int. Cl.[5] .............................................. A47J 37/12
[52] U.S. Cl. ...................................... 99/405; 99/407; 198/731
[58] Field of Search ................... 99/403-409, 99/442, 443 C, 354, 644; 198/721, 731; 15/304, 307; 134/126

[56] References Cited

U.S. PATENT DOCUMENTS

| 625,213 | 5/1899 | Suell . | |
|---|---|---|---|
| 1,560,716 | 11/1925 | Newdick | 198/731 |
| 1,823,146 | 9/1931 | Hunter | 99/405 |
| 1,904,370 | 4/1933 | Hunter | 99/405 |
| 1,944,374 | 1/1934 | Schmidtke . | |
| 2,143,838 | 1/1939 | Boettger | 134/126 |
| 2,538,937 | 1/1951 | Foster . | |
| 2,546,262 | 3/1951 | Hatcher . | |
| 2,887,212 | 5/1959 | Waite . | |
| 3,089,579 | 5/1963 | Beck | 198/731 |
| 3,152,537 | 10/1964 | Dietz . | |
| 3,329,081 | 7/1967 | Roth | 99/405 |
| 3,340,792 | 9/1967 | Matzke . | |
| 4,176,590 | 12/1979 | Kochan | 99/409 |
| 4,189,994 | 2/1980 | Schmader . | |
| 4,296,769 | 10/1981 | van der Lugt | 134/126 |
| 4,346,649 | 8/1982 | Wilke et al. . | |
| 4,370,921 | 2/1983 | Moller et al. . | |
| 4,628,804 | 12/1986 | Belshaw et al. . | |
| 4,699,796 | 10/1987 | Belshaw et al. . | |
| 4,908,002 | 3/1990 | Tanis | 198/731 |
| 4,936,201 | 6/1990 | Woodworth et al. . | |

FOREIGN PATENT DOCUMENTS 669487  8/1963  Canada ................................ 99/405

OTHER PUBLICATIONS

Official Gazette, Jul. 4, 1967, p. 94, U.S. Pat. No. 3,329,081 abstract.

Primary Examiner—Timothy F. Simone
Attorney, Agent, or Firm—Virgil B. Hill

[57] ABSTRACT

A doughnut fryer flight conveyor for selectively advancing different size dough forms through the hot oil bath of a doughnut frying machine includes a plurality of primary flights extending between spaced, parallel, endless copnveyor chains and a plurality of secondary flights or pusher bars. The secondary flights are each positioned between adjacent pairs of primary flights. A clutch ring mounts the secondary flights to the conveyor chain so that the flights may be moved to an inoperative position immediately adjacent one of the primary flights to an operative position intermediate the flights. When in the operative position, the doughnut fryer flight conveyor is adapted to advance a smaller size doughnut or dough form through the frying machine.

17 Claims, 2 Drawing Sheets 5,065,670

CONVEYOR FOR DOUGHNUT FRYER

BACKGROUND OF THE INVENTION

The present invention relates to doughnut frying machines and, more particularly, to a flight conveyor for advancing dough forms through a doughnut fryer.

Doughnut frying machines include an elongated tank or frying kettle containing a hot oil or frying shortening bath. A depositor is positioned at one end of the tank. A receiving conveyor adjacent the depositor includes a plurality of equally spaced flights or pusher bars which receive raw dough forms deposited into the tank. The conveyor advances the forms toward a turnover device. The turnover device receives partially fried dough forms, turns them over and delivers them to a delivery conveyor. The delivery conveyor receives the partially fried, turned over dough forms and advances them to a discharge end of the tank. The depositor, the conveyors and the turnover device are synchronized through a chain, drive motor and sprocket arrangement. An example of a doughnut frying machine may be found in U.S. Pat. No. 3,329,081 entitled DOUGHNUT MACHINE WITH FLOATING KETTLE HAVING HEAT TRANSFER COILS AND A REMOVABLE OPERATING UNIT WITH THE KETTLE which issued on July 4, 1967 to Roth.

Generally, each flight conveyor includes a pair of spaced, parallel, endless chains which extend over sprockets along each side of the tank. A plurality of flights or pusher bars extend between the chains in equally spaced, parallel relationship. Adjacent flights define a row area for receipt of a plurality of dough forms. The dough forms are deposited in a row and advanced through contact with the rear most flight. The spacing or pitch between adjacent flights or pusher bars is set for a particular size or limited range of dough forms and, hence, doughnuts. If the size of the dough form is reduced below a predetermined minimum, shingling or collection of the dough forms adjacent one end of the fryer occurs. When the misaligned doughnuts reach the turning device, problems are encountered. The doughnuts may end up stacked on top of each other when transferred through the turning device to the delivery conveyor. The dough forms may be flipped by the turning device back towards the receiving conveyor and then flipped by the turning device to the delivery conveyor so that the same side of the dough form is fried twice. This failure to properly turn or flip the dough forms results in white caps and improperly fried doughnuts.

Heretofore, attempts have been made to minimize or prevent the occurrence of stacking or white caps. One such proposal employs a plurality of air manifolds and nozzles which direct air jets onto the bath in an attempt to keep the dough forms properly positioned in a single row and prevent collection adjacent one side thereof. The use of air jets has generally not been successful, especially when a standard doughnut fryer is used to fry miniature dough forms. Another approach is disclosed in U.S. Pat. No. 4,370,921 entitled DOUGHNUT FRYER GUIDE which issued on Feb. 1, 1983 to Moller et al. As disclosed therein, a fryer guide, including a plurality of elongated, transversely spaced guide bars, is selectively positionable onto or adjacent the conveyor flights. The guide bars may be retracted so as not to interfere with large dough forms as they advance through the fryer. When moved to an operative position, the dough forms are retained in rows by the guide bars which prevent collection of the dough forms adjacent one side of the fryer.

Prior approaches have not been fully satisfactory. Operational difficulties have been encountered. The prior devices have not been readily incorporated in existing machines. A need exists, therefor, for a doughnut fryer flight conveyor which is readily adaptable to the frying of different sized dough forms or doughnuts.

SUMMARY OF THE INVENTION

In accordance with the present invention, the aforementioned need is fulfilled. Essentially, a short or secondary flight assembly is provided which is attachable to a doughnut fryer conveyor of the type having a plurality of equally spaced, parallel, transversely extending primary flights or pusher bars. The secondary flight assembly includes an elongated secondary flight having ends. Provision is made for attaching the secondary flight to the conveyor so that it may be selectively positioned or moved from an inoperative position to an operative position reducing the pitch or spacing between flights and adapting the conveyor to the advance of smaller or miniature dough forms.

In narrower aspects of the invention, the attachment means includes a pair of link adaptors, one of which includes a noncircular pin. A clutch ring including a pair of resiliently biased, shiftable clutch ring halves encircles the noncircular pin. The clutch ring is joined to the secondary or short flight. The clutch ring permits the selective positioning and holding of the flight in position relative to the link and the primary flights of the conveyor. When larger or standard sized dough forms are to be fried, the secondary flight is pivoted through an angle of 180° so that it is immediately adjacent one of the primary flights. The standard spacing between the primary flights is, therefore, available for receipt of a row of doughnuts. The secondary flight assemblies are readily incorporated into new doughnut fryer conveyors and may be retrofitted into existing doughnut fryer machines. The secondary flight subassembly provides a simple and reliable solution to the problem of adaptation of doughnut frying machines to different sized dough forms. The subassembly eliminates shingling and resulting white caps or stacked dough forms.

DETAILED DESCRIPTION OF THE PREFERRED EMBODIMENT

Figure 1:
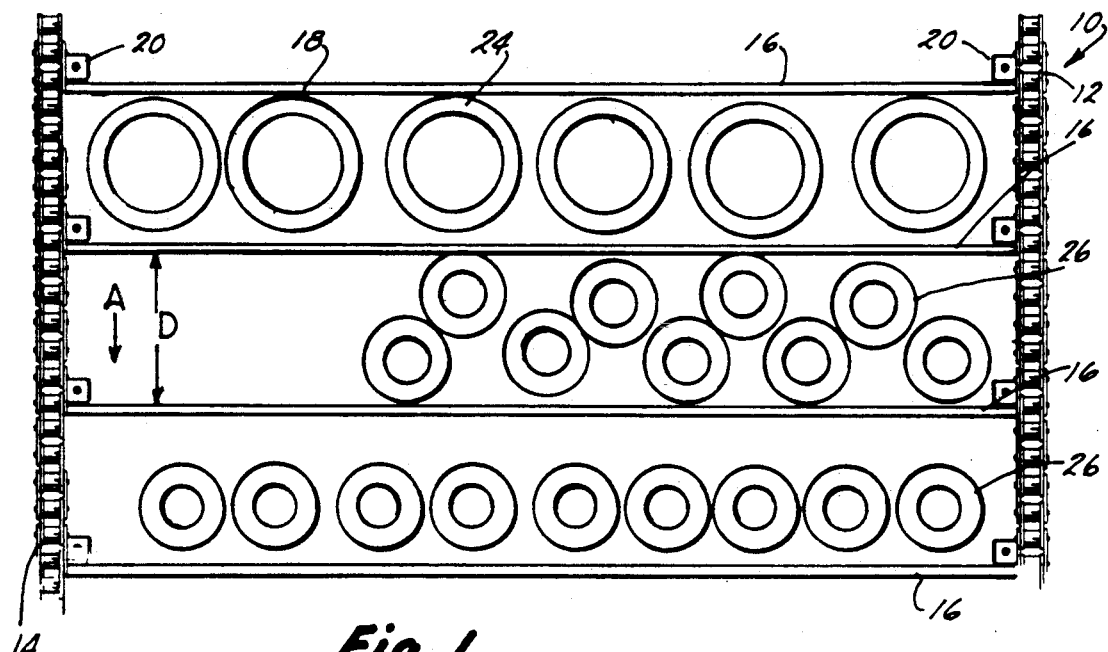
FIG. 1 is a fragmentary, top plan view of a doughnut fryer flight conveyor.

A portion of a doughnut fryer flight conveyor incorporated in a standard doughnut fryer is illustrated in FIG. 1 and generally designated by the numeral 10. The conveyor includes spaced, parallel, endless conveyor chains 12, 14. A plurality of laterally extending, equally spaced, parallel primary flights or pusher bars 16 extend between chains 12, 14. Each pusher bar 16 includes a central, elongated, generally rectangular member 18 having attachment tabs 20. As discussed below, tabs 20 attach to links or side plates of the endless roller chain 12, 14. Conveyor 10 is incorporated in a standard doughnut fryer which includes an elongated metal frying kettle or tank, a depositor, a receiving conveyor, a turnover device and a delivery conveyor.

The doughnut fryer and standard doughnut fryer flight conveyor are well known to those of ordinary skill in the art. Such are disclosed, for example, in the aforementioned U.S. Pat. No. 3,329,081. To the extent necessary, the disclosure of such patent is hereby incorporated by reference.

As illustrated in FIG. 1, the spacing or pitch D between adjacent pairs of flights 16 is set for a standard size dough form or doughnut 24. Typically, this spacing is on the order of $3\frac{1}{8}''\pm\frac{1}{8}''$. The standard size dough forms are deposited on the conveyor in a conventional fashion in a row. The spacing between the pusher bars 16 retains the dough forms in proper alignment as the conveyor advances the dough forms through the kettle in the direction of arrow A. When the standard doughnut fryer flight conveyor is used to fry or advance reduced size or miniature dough forms 26, problems are encountered. As illustrated, the spacing D permits the dough forms 26 to shingle or collect towards one side of the conveyor. The doughnuts are generally not maintained in the desired, controlled pattern as with forms 24.

Figure 2:
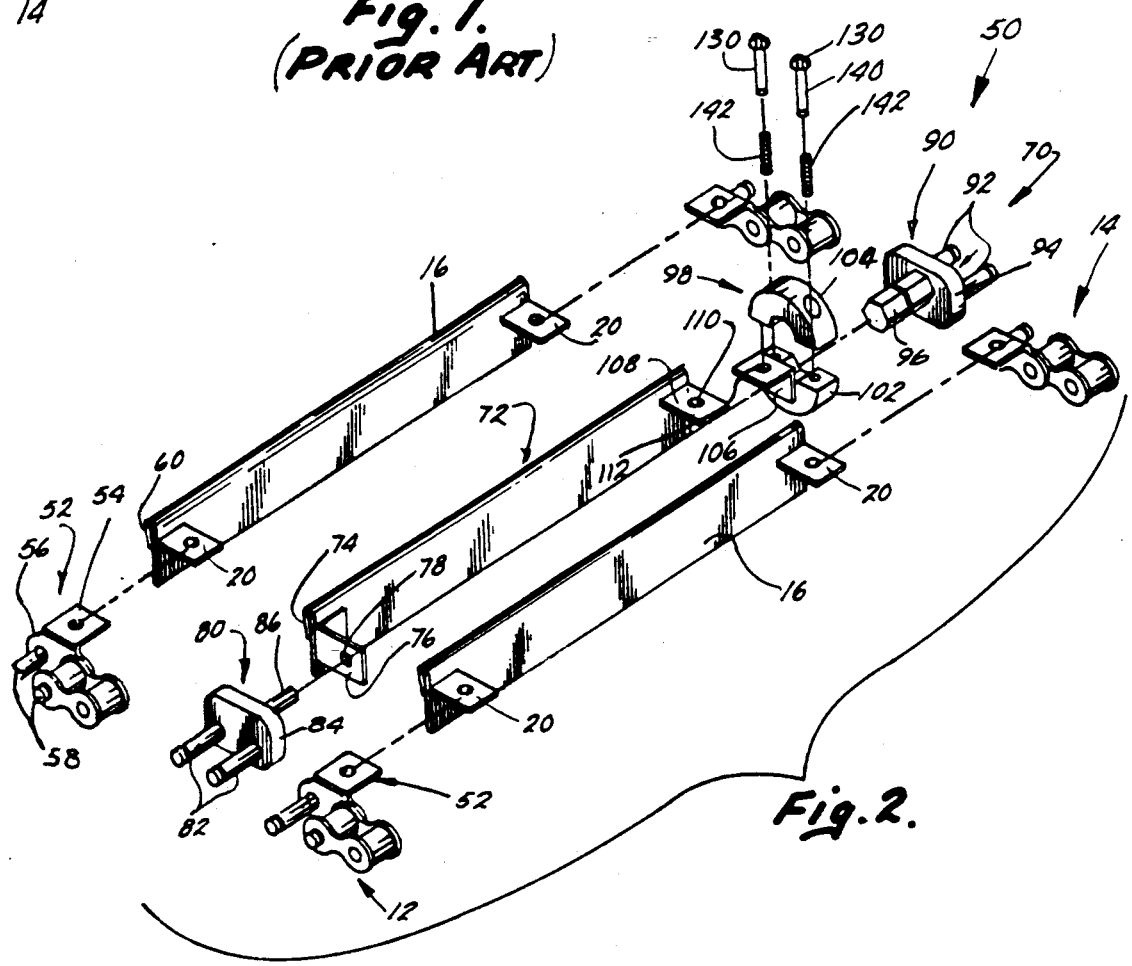
FIG. 2 is an exploded, enlarged view of a secondary flight subassembly in accordance with the present invention.
Figure 4:
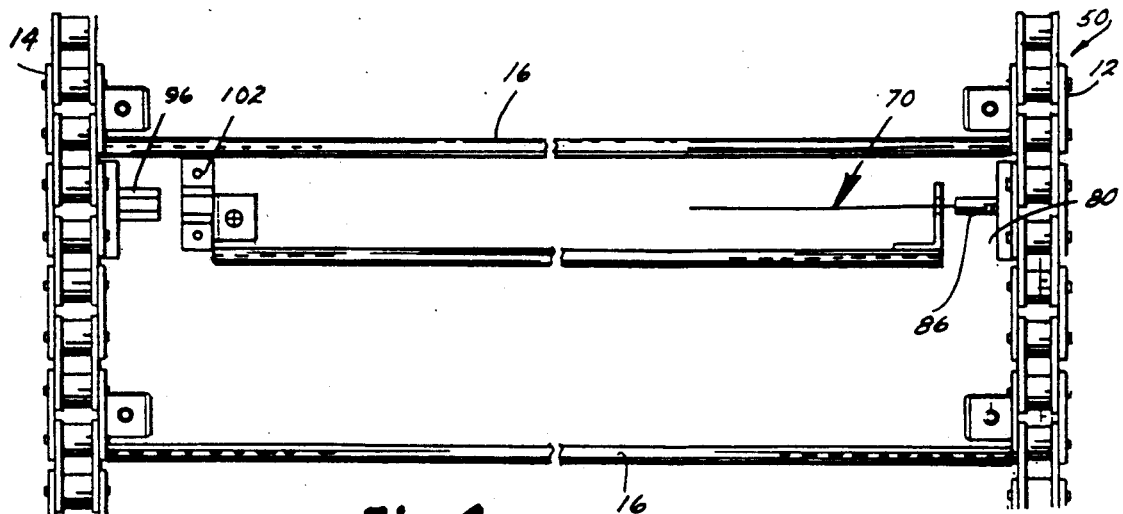
FIG. 4 is an enlarged, partially exploded top fragmentary view of a doughnut fryer flight conveyor in accordance with the present invention.
Figure 5:
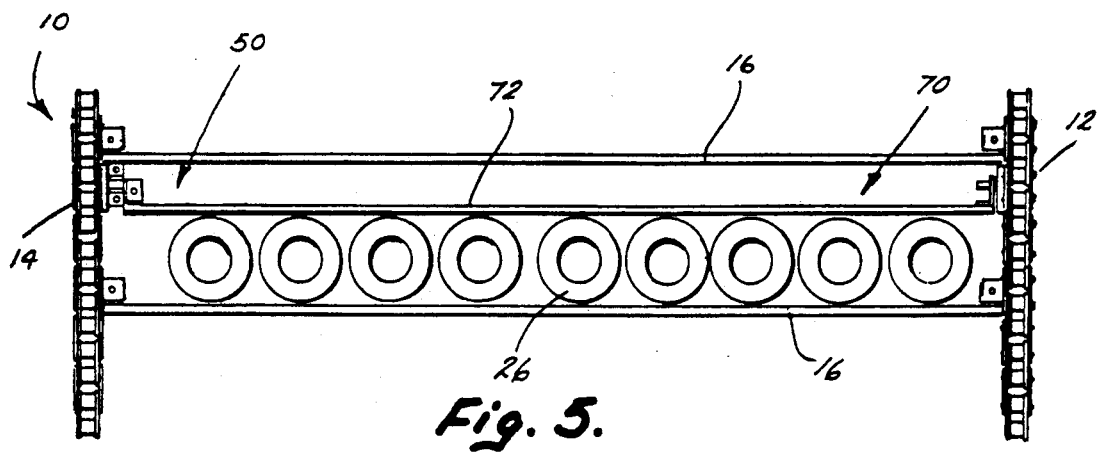
FIG. 5 is a fragmentary, top plan view of a flight conveyor in accordance with the present invention showing a row of dough forms positioned against a secondary flight or pusher bar.

A conveyor in accordance with the present invention is illustrated in FIGS. 2, 4 and 5 and generally designated by the numeral 50. Conveyor 50 includes primary or long flights or pusher bars 16. Pusher bars 16 are joined to endless chain conveyors 12, 14 by attachment links 52. Attachment links 52 include attachment tabs 54 bent from a side plate portion 56. Extending from side plate 56 are pins 58. Pins 58 extend through side plates of a conveyor chain link and are surrounded by rollers of the conveyor chain in a conventional fashion. Attachment tabs 20 joined to pusher bars 16 are attached to tabs 54 by suitable fasteners. Each pusher bar 16 is an elongated, generally rectangular member having a reversed bent flange 60 at its top portion.

A secondary flight subassembly 70 is joined to chains 12, 14 intermediate each set of adjacent primary flights 16. Subassembly 72 includes a secondary flight or pusher bar 72. Pusher bar 72 is an elongated member having the same general configuration as primary bar 16 and a reversed bent portion 74. Secured to one end of bar 72 is an L-shaped or angled attachment bracket 76. Bracket 76 faces chain 12 and defines a pivot aperture 78. A pivot pin master link 80 pivotally secures secondary flight 72 to the chain at attachment tab 76. Link 80 includes chain pins 82, a master link plate portion 84 and an outwardly extending pivot pin 86.

The opposite end of secondary flight 72 is attached to chain 14 through an attachment means including a master link 90. Link 90 includes chain pins 92, a plate portion 94 and a hexagonal or noncircular axle, pin or stub shaft 96. Stub shaft 96 is encircled by a clutch ring subassembly 98.

Figure 3:
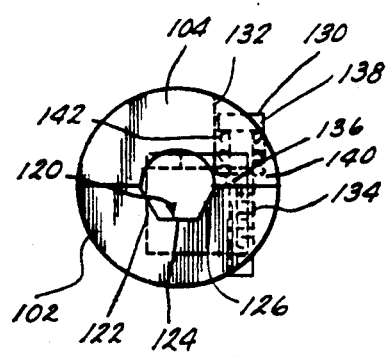
FIG. 3 is an elevational view of a clutch ring incorporated in the present invention.

As seen in FIGS. 2 and 3, the clutch ring subassembly 98 includes a lower clutch ring half 102 and an upper clutch ring half 104. An angled attachment bracket or tab portion 106 is secured to lower clutch ring 102. An outwardly extending attachment tab 108 is secured to flight 72. Tab 108 is joined to tab 106 by a suitable fastener passing through apertures 110, 112.

Figure 6:
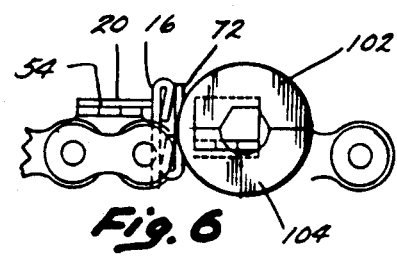
FIG. 6 is a fragmentary, side elevational view of a portion of the flight conveyor showing the secondary flight in the stored or inoperative position.
Figure 7:
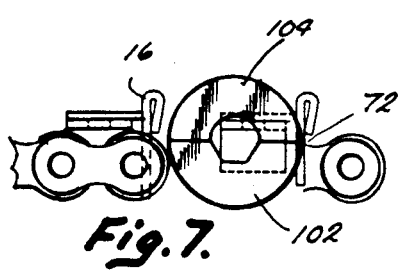
FIG. 7 is a fragmentary, elevational view showing the secondary flight in the operative position.

As seen in FIGS. 3, 6 and 7, lower clutch ring half 102 defines an upwardly opening slot 120 which is configured to mate with hexagonal pin 96. Slot 120 includes three sides 122, 124 and 126. Upper clutch ring half 104 is secured to lower clutch ring half 102 by a pair of fasteners or pins 130. Each fastener 130 extends through a stepped bore 132 formed in clutch ring half 104 and into a threaded passage 134 in lower ring 102. Fastener 130 includes a shank 136 and a head 138. Captured between head 138 and a shoulder 140 defined by stepped bore 132 is a coil spring 142. Upper clutch ring half 104 may, therefore, be moved away from the lower clutch ring half against the resilient bias of the springs 142.

As seen in FIGS. 4, 5, 6 and 7, the secondary flight subassembly 70 is mounted on chains 12, 14 by positioning mounting tabs 76 over pin 86 of adaptor link 80 and by positioning the lower clutch ring half 102 underneath shaft or pin 96. Upper clutch ring half 104 may then be attached by threading pins or fasteners 130 through bores or passages 132 with springs 142 positioned around the shank portions. Pin 96 is, therefore, captured by the clutch ring subassembly 98.

As shown in FIG. 6, clutch ring 98 and pivot pin 86 allow the secondary flight 72 to be rotated about pins 86, 96 to an inoperative position wherein secondary flight 72 is immediately adjacent to and nests with primary flight 16. The complimentary configuration of clutch ring half 102 holds the flight 72 in position due to its engagement with hexagonal pin 96.

When each secondary flight is in the stored position illustrated in FIG. 6, the conveyor is set to receive standard size dough forms. When it is desired to fry miniature or reduced size dough forms, flight 72 is grasped and rotated through an angle of 180° about hexagonal pin 96 and pin 86 to an operative position. The positioning of the flight in the operative position is shown in FIGS. 5 and 7. The spacing between secondary flight 72 and the forward primary flight 16 is now optimized for the reduced size dough forms 26. Dough forms 26 are positioned on the conveyor in an orderly fashion. Shingling is eliminated. Problems at the turning device are substantially reduced, if not eliminated.

The secondary flight subassembly eliminates the air manifolds and air nozzles heretofore required for use in an attempt to prevent shingling. A single row of nozzles may still be used at the turning device to assist in floating the dough forms into the turner. The secondary flight subassemblies are readily incorporated into the doughnut fryer conveyor during initial manufacture. One assembly is provided for each set of adjacent primary flights. The secondary flight assemblies are also readily retrofitted to existing machines. The present invention, therefore, provides an easily used, efficient, relatively inexpensive and reliable solution to white cap and stacking problems heretofore experienced.

In view of the foregoing description, those of ordinary skill in the art may envision various modifications which would not depart from the inventive concepts disclosed. It is expressly intended, therefore, that the above description should be considered as only that of the preferred embodiment. The true spirit and scope of the present invention may be determined by reference to the appended claims.

The embodiments of the invention in which an exclusive property or privilege is claimed are defined as follows:

1. A doughnut fryer flight conveyor for selectively advancing different size dough forms through the hot oil bath of a doughnut frying machine, said conveyor comprising:
   a pair of spaced, endless conveyor chains;
   a plurality of primary flights extending between said chains in spaced, parallel relationship;
   a plurality of secondary flights; and
   a plurality of secondary flight mounting means each joined to one of said secondary flights for mounting each of said secondary flights on said chains in between an adjacent pair of primary flights, said mounting means permitting each of said secondary flights to be moved from an inoperative position to an operative position defining a reduced flight pitch to permit smaller size dough forms to be advanced by the conveyor than can be advanced by said primary flights.

2. A doughnut fryer flight conveyor as defined by claim 1 wherein said mounting means comprises:
   a noncircular axle; and
   clutch means on said axle and joined to a secondary flight for selectively positioning and holding said secondary flight in its operative and inoperative positions.

3. A doughnut fryer flight conveyor as defined by claim 2 wherein said clutch means comprises:
   a first clutch member;
   a second clutch member on said first clutch member; and
   resilient means engaging said first clutch member for resiliently biasing said first clutch member towards said second clutch member and into engagement with said axle.

4. A doughnut fryer flight conveyor as defined by claim 3 wherein one of said clutch members defines an upwardly opening, three-sided slot and the other of said clutch members defines a downwardly opening semicircular slot, said slots capturing said axle.

5. A doughnut fryer flight conveyor as defined by claim 4 wherein said axle has a hexagonal cross section.

6. A doughnut fryer flight conveyor as defined by claim 3 wherein one of said clutch members defines a stepped bore facing the other of said clutch members and wherein said resilient means comprises a headed member joined to the other of said clutch members and extending through the bore, and a spring engaging said headed member and said one of said clutch members.

7. A doughnut fryer flight conveyor as defined by claim 2 wherein said mounting means includes a plurality of pivot pins, each pivot pin being joined to one of said chains and engaging one of said secondary flights.

8. A doughnut fryer flight conveyor as defined by claim 7 wherein said clutch means comprises:
   a lower clutch member;
   an upper clutch member on said lower clutch member; and
   resilient means engaging said upper clutch member for resiliently biasing said upper clutch member towards said lower clutch member and into engagement with said axle.

9. A doughnut fryer flight conveyor as defined by claim 8 wherein one of said clutch members defines a stepped bore facing the other of said clutch members and wherein said resilient means comprises a headed member joined to the other of said clutch members and extending through the bore, and a spring engaging said headed member and said one of said clutch members.

10. A doughnut fryer flight conveyor as defined by claim 9 wherein said lower clutch member defines an upwardly opening, three-sided slot and said upper clutch member defines a downwardly opening semicircular slot, said slots capturing said stub shaft.

11. A secondary flight assembly attachable to a doughnut fryer conveyor between a pair of spaced, parallel primary flights to reduce the flight pitch and adapt the conveyor to smaller size dough forms, said assembly comprising:
   an elongated secondary flight having ends; and
   attachment means engaging the ends of said secondary flight for permanently attaching the secondary flight to the conveyor between a pair of spaced primary flights and for permitting the secondary flight to be selectively moved from an inoperative position to an operative position intermediate the primary flights so that the conveyor may be used to advance different size dough forms.

12. A secondary flight assembly as defined by claim 11 wherein said secondary flight is an elongated, generally rectangular bar having an attachment tab at each end.

13. A secondary flight assembly as defined by claim 12 wherein said attachment means comprises:
   a first link having a pin extending therefrom, said pin extending into an aperture defined by one of said tabs.

14. A secondary flight assembly as defined by claim 11 wherein said attachment means comprises:
   a link adapted to be joined to a fryer conveyor chain, said link including a noncircular mounting pin.

15. A secondary flight assembly as defined by claim 14 wherein said attachment means further includes:
   clutch means joined to one of said ends of said secondary flight and encircling said mounting pin for selectively positioning and holding said flight with respect to said mounting pin so that the secondary flight may be moved from an inoperative position through an angle of 180° to an operative position.

16. A secondary flight assembly as defined by claim 15 wherein said attachment means further includes:
   another link including a pivot pin engaging another end of said secondary flight and adapted to mount the other end to a fryer conveyor.

17. A secondary flight assembly as defined by claim 16 wherein said clutch means comprises:
   a first clutch ring half defining a slot having a configuration complimentary to the configuration of said mounting pin;
   a second clutch ring half positioned on said first clutch ring half to capture the mounting pin therebetween; and
   resilient means engaging one of said ring halves for resiliently biasing said halves towards each other.

* * * * *